United States Patent
Nguyen et al.

(12)

(10) Patent No.: US 6,581,203 B1
(45) Date of Patent: Jun. 17, 2003

(54) TECHNIQUE FOR VISUALLY CREATING AND ADDING MEMBERS TO A CLASS

(75) Inventors: Binh Q. Nguyen, Cary, NC (US); Gennaro A. Cuomo, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 886 days.

(21) Appl. No.: 08/915,655

(22) Filed: Aug. 21, 1997

(51) Int. Cl.[7] ................................................ G06F 9/44
(52) U.S. Cl. ........................ 717/106; 717/106; 717/108; 717/116
(58) Field of Search ................................. 395/702, 707, 395/712; 345/340; 717/100, 101, 104, 105, 106, 108, 109, 116, 120

(56) References Cited

U.S. PATENT DOCUMENTS

| | | | | |
|---|---|---|---|---|
| 4,965,827 A | | 10/1990 | McDonald .................. | 705/65 |
| 5,142,578 A | | 8/1992 | Matyas et al. .............. | 380/212 |
| 5,481,718 A | * | 1/1996 | Ryu et al. .................. | 395/683 |
| 5,485,617 A | * | 1/1996 | Stutz et al. ................. | 395/683 |
| 5,544,245 A | | 8/1996 | Tsubakiyama .............. | 713/171 |
| 5,651,108 A | * | 7/1997 | Cain et al. .................. | 345/340 |
| 5,872,973 A | * | 2/1999 | Mitchell et al. ............ | 709/332 |
| 5,907,706 A | * | 5/1999 | Brodsky et al. ............ | 717/105 |
| 5,913,063 A | * | 6/1999 | McGurrin et al. .......... | 717/109 |
| 5,991,536 A | * | 11/1999 | Brodsky et al. ............ | 717/104 |
| 6,118,446 A | * | 9/2000 | Jones et al. ................. | 717/105 |
| 6,182,279 B1 | * | 1/2001 | Buxton ....................... | 717/100 |
| 6,249,905 B1 | * | 6/2001 | Yoshida et al. ............. | 717/100 |

OTHER PUBLICATIONS

Biddle et al, Essential use cases and responsibility in object oriented development, Australian Computer Soc., pp 7–16, 2002.*
Hymes, Conflicting class structures between the object orienetd paradigm and users concepts, ACM ACHI, pp 57–58, 1995.*
Hendler, Enhancement for multiple inheritance, ACM SIGPLAN Notice, v. 21, No. 10, pp 98–106, 1986.*
Kevin Weks, "The sweet smell of C + +", Windows Tech Journal, pp. 69–72, Aug. 1994.*
Rational Rose, Using rational Rose 4.0, Rational Software Corp. Santa Clara, CA, Nov. 1996.*
O'Higgins et al.: "Encryption and ISDN—A Natural Fit" Innovations in Switching Technology, Phoenix, Arizona, Mar. 15–20, 1987, vol. Part. 4, No. Symp. 1987, Mar. 12, 1987, Institute of Electrical and Electronics Engineers, pp. 863–869, XP002017713.

* cited by examiner

Primary Examiner—Anil Khatri
(74) Attorney, Agent, or Firm—Gregory M. Doudnikoff

(57) ABSTRACT

A technique for visually creatins and populating a class with members. A developer is provided with a container window representing a new class when the developer indicates that a new class is to be built. The developer vary populate the new class with members in a number of ways, including dragging visual elements representative of code to the container window and dropping them in the container window. By dropping the visual element into the container, an association between the code the visual element represents and the class represented by the container window is established. This relationship is also displayed to the developer by displaying the visual element within the container window.

12 Claims, 6 Drawing Sheets

TECHNIQUE FOR VISUALLY CREATING AND ADDING MEMBERS TO A CLASS

BACKGROUND OF THE INVENTION

1. Field of the Invention

The present invention relates to a technique in a computer based data processing system for providing an intuitive graphical user interface which permits a developer to visually build a class with members. More particularly, the present invention relates to a technique by which a class and its associated members are created through a new visual paradigm which does not require the wiring of objects together or extensive use of editors.

2. Description of the Related Art

Over the last few years, object oriented programming has gained in popularity. Developing software applications using an object oriented language in an object oriented development environment can be easier than writing traditional procedural software applications, since object oriented development environments rely extensively on the reuse of code from class libraries, or blocks of code, which are prewritten to form particular functions. For relatively high level functions, the availability of and ease of use provided by class libraries has proven extremely important to the acceptance of object oriented languages. However, for complex programs or at low levels of an application which a developer is creating, classes available from class libraries often do not provide the detailed functionality or the complete functionality which may be required in an individual class. This often occurs when a developer, for example, wants to provide a detailed and customized graphical user interface. To date, the coding process for such code requires a lot of detail work on the part of the developer, such as coding by hand or pulling very small and detailed pieces of code together through a drag and drop paradigm and wiring the pieces together in a wiring diagram which visually represents the relationship between the pieces of code.

A number of tools have been developed which attempt to make this coding process easier. One technique involves coding while viewing the class hierarchy in a "browser". For example, an application development tool called VisualAge for Smalltalk from the International Business Machines Corporation (IBM) uses a browser to show the hierarchical relationships between classes which comprise a software application which is being developed. VisualAge is a registered trademark of IBM. The VisualAge browser provides a series of interrelated columns which visually illustrate the relationships between elements and provides a work space for writing code to add to the hierarchy. A browser can be found in U.S. Pat. No. 5,615,346 to Gerken, which is assigned to IBM. In the Gerken browser, hierarchy relationships are graphically indicated by the lists of elements within each column, and code can be reviewed or edited in an editing window which appears below the columns.

Another technique for creating a class is provided by Symantec Corporation's Visual Cafe Pro product for Java (Java is a trademark of Sun Microsystems Inc.). Visual Cafe Pro's hierarchy editor allows a developer to visually architect an application by creating new classes in a graphical editor. A developer directly manipulates the application's inherent structure by dragging and dropping from one class to another, which changes both the visual model and the underlying source code. Double clicking on a class invokes a class browser, and individual class members can be edited by opening an individual member or source subwindow.

Another visual programming paradigm is provided in U.S. Patent Application Ser. No. 08/657,510, entitled "Visual Programming From a Tree Structure", was filed on Jun. 4, 1996, and is assigned to IBM. This visual programming technique provides an intuitive method for developing an object oriented application from a class tree structure, and provides a superior solution for programming high level functionality.

One problem with these solutions is that they can easily overwhelm the limited space available within a graphical user interface, and thus the relationships between elements can become confused. Further, their ability to simplify the application development process for providing low level functionality is limited.

Accordingly, a need exists for a technique providing an intuitive visual building system through which a developer can create or build a class and its associated members in real time and easily understand all of the relationships involved.

SUMMARY OF THE INVENTION

An object of the present invention is to provide a visual class building system.

Another object of the invention is to permit a developer to generate class codes syntax from the visual model without requiring developer knowledge of the format.

Other objects and advantages of the present invention will be set forth in part in the description and the drawings which follow, and, in part, will be obvious from the description or may be learned by practice of the invention.

To achieve the foregoing objects, and in accordance with the purpose of the invention as broadly described herein, the present invention provides a technique for permitting a software developer to visually build a class and displaying the contents of the class in an intuitive manner, comprising first subprocesses for displaying a container window representing a class upon selection by a user of an option to create a new class; second subprocesses for permitting the user to populate the class with members by adding visual representations of elements which represent code to the container window; third subprocesses for displaying the visual representations of the elements which comprise the members of the class within the container window; and fourth subprocesses for generating code for the class to conform to the visually built class.

The present invention may also comprise fifth subprocesses for permitting a user to add a first class as a member of a second class by dragging a container window which represents the first class into a container window which represents the second class. Further, the members of the class may be instance variables for the class. Also, the visual representations which are added to a container window may be dragged from a tool bar.

The present invention will now be described with reference to the following drawings, in which like reference numbers denote the same element throughout.

DESCRIPTION OF THE PREFERRED EMBODIMENT

Figure 1:
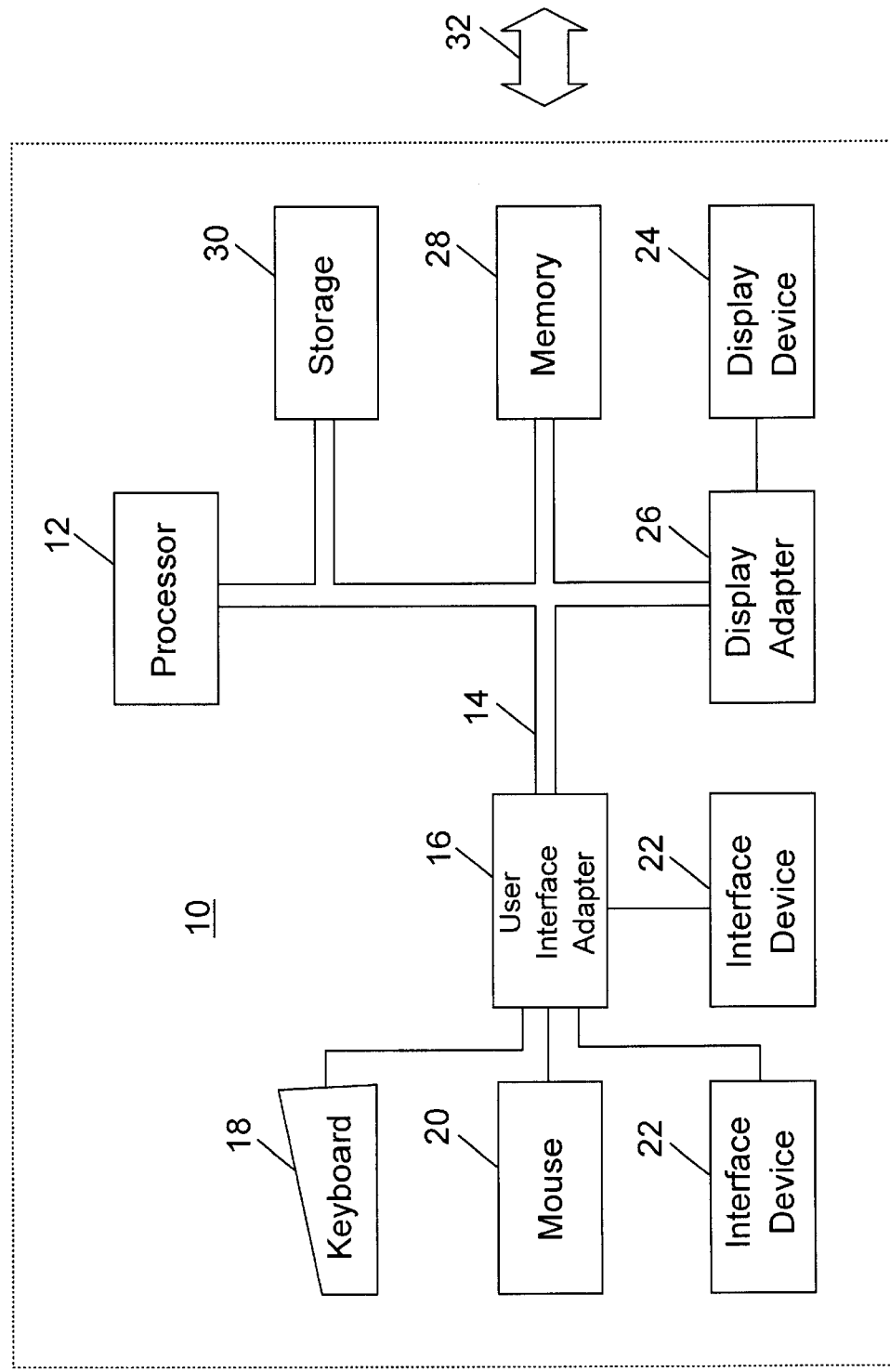
FIG. 1 is a pictorial representation of a data processing system which may be utilized to implement the present invention.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long term storage 30 which can include a hard drive, tape drive, etc.

The workstation 10 communicates via a communications channel 32 with other computers or networks of computers. The workstation 10 may be associated with such other computers in a local area network (LAN) or a wide area network, or the workstation 10 can be client in a client/server arrangement with another computer, etc. All of these configurations, as well as the appropriate communications hardware and software, are known in the art.

Figure 2:
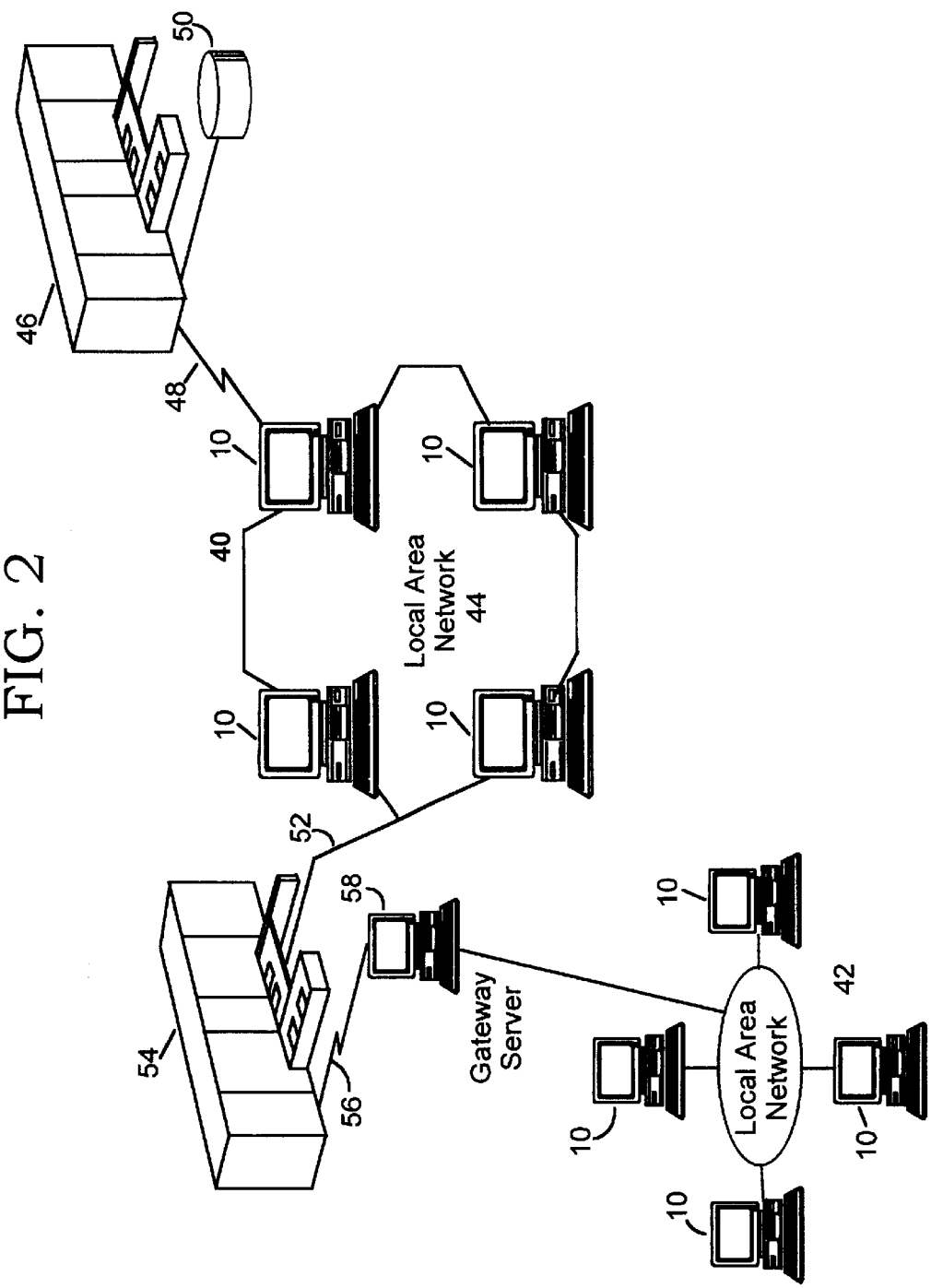
FIG. 2 is a diagram of a networked computing environment in which the present invention may be practiced.

FIG. 2 illustrates a data processing network 40 in which the present invention may be practiced. The data processing network 40 includes a plurality of individual networks, including LANs 42 and 44, each of which includes a plurality of individual workstations 10. Alternatively, as those skilled in the art will appreciate, a LAN may comprise a plurality of intelligent workstations coupled to a host processor.

Still referring to FIG. 2, the data processing network 40 may also include multiple mainframe computers, such as a mainframe computer 46, which may be preferably coupled to the LAN 44 by means of a communications link 48. The mainframe computer 46 may be implemented utilizing an Enterprise Systems Architecture/370, or an Enterprise Systems Architecture/390 computer available from the International Business Machines Corporation (IBM). Depending on the application, a midrange computer, such as an Application System/400 (also known as an AS/400) may be employed. "Enterprise Systems Architecture/370" is a trademark of IBM; "Enterprise Systems Architecture/390", "Application System/400" and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit/communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention is typically stored in permanent storage of some type, such as the permanent storage 30 of the workstation 10. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

The preferred embodiment of the present invention will now be discussed with reference to FIGS. 3 through 6.

In the preferred embodiment, the present invention is implemented as a tool written in the Java language for use in creating Java classes for Java programs. Object oriented languages, such as Java, Smalltalk and C++, typically include class libraries for use by developers when programming (developing applications) in the language. Class libraries are reusable sets of classes which typically provide relatively high level functionality. A class is one of the basic building blocks of object oriented languages, and comprises code which represents a combination of function and data. A developer creates an application by adding classes from a class library to the software application being created. A copy or instance of a class is included in the application being created. However, to provide detailed function or customization for an application being developed, individual classes may have to be created by the developer which are not available in a class library.

A developer may manipulate classes in a predetermined number of ways, depending on the features of the individual language. For example, most object oriented classes have a number of basic characteristics, including encapsulation, polymorphism, and inheritance. Through polymorphism, a software component or class may make a request of another instance of the class without knowing exactly what that component or object is. The object or component which receives the request interprets the request and determines, in accordance with its internal data and functions, how to execute the request. The concept of inheritance permits easy modification of a class. A developer can write a subclass which inherits behavior from all of its parent classes.

All of these properties of object oriented programming, as well as related object orienting programming techniques, are well known to those skilled in the art, and will not be discussed in depth herein. While the present invention will be described in terms of a technique for using a visual paradigm to create Java classes for use in a Java program, the present invention may be utilized in development environments for other object oriented languages, such as Smalltalk and C++.

Figure 3:
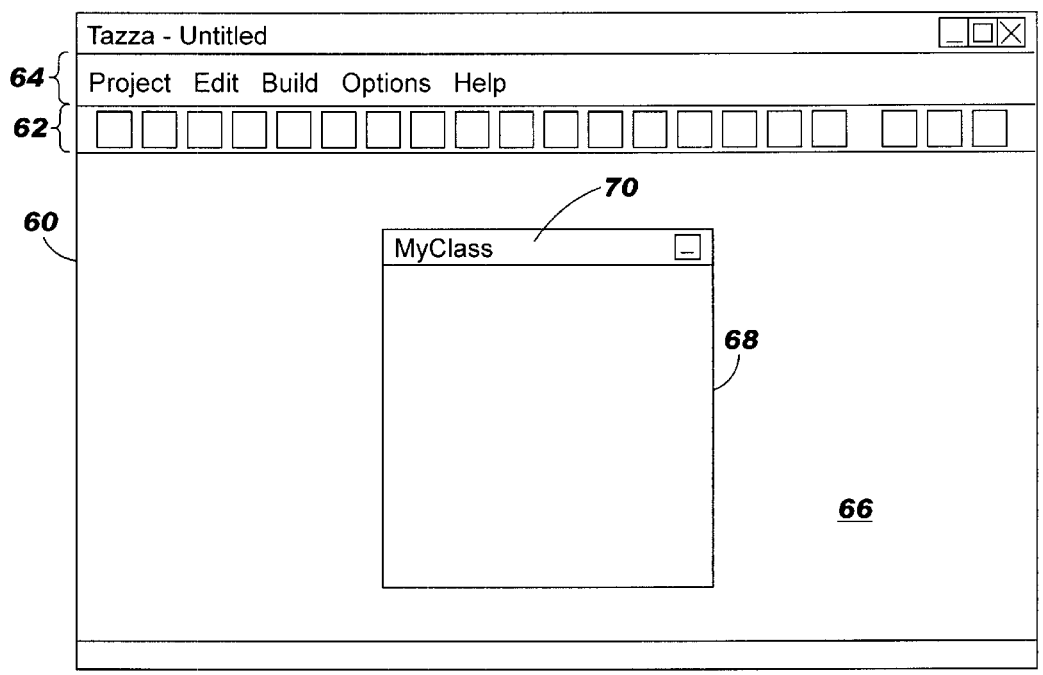
FIG. 3 illustrates a class development window which includes a class container window in accordance with the present invention.

Creating a class for use in an application is not new, nor is the concept of populating a class with members. What the present invention provides is a simpler and novel technique for creating a class and populating the class with members through a unique visual paradigm. Preferably, the present invention is employed within an application development tool as a feature thereof. Referring now to FIG. 3, the present invention provides a window 60 in which to visually build a class. The window 60 includes a tool bar 62, a menu bar 64 and a work space 66. By selecting a graphical "create a new class" option from the tool bar 62 or a textual option found by manipulating the menu bar 64, a container window 68 is provided in the work space 66 which visually represents a new class that the developer is adding. The appropriate code which corresponds to the new class, which is simply a shell at this time, is also created from a class library and is associated with the graphical representation, in accordance with known techniques. A default name can be provided in an class name portion 70 of the class container window 68, or the developer can enter a desired name for the class in the class name portion 70.

The class container window 68 can now encapsulate any class object which is dragged into it. Any class object which is placed in the class window 68 is implicitly associated with the class represented by the class window 68 through the visual containment/by being placed in the class window 68. These class objects become members of the class represented by the class window 68. This technique of physically placing the class member into the class window replaces the prior art technique of making or creating relationships by wiring the components together to make the relationship. The technique for creating the corresponding code which mirrors the physical representation can be carried out by one skilled in the art, and will not be discussed in detail herein. Further, the class represented by the class window 68 can be dragged into another class window to establish a member relationship with the class represented by the other class window.

Figure 4:
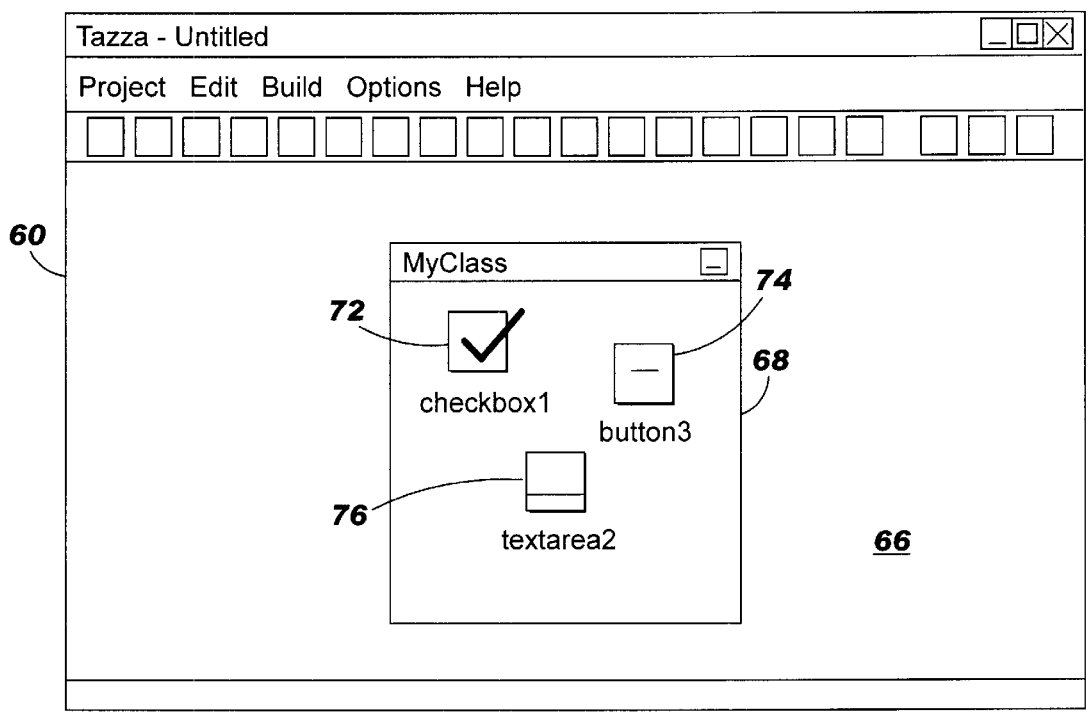
FIG. 4 illustrates the class container window of FIG. 3 after class members have been added thereto.

FIG. 4 illustrates the class window 68 of FIG. 3 after members 72, 74, 76 have been added thereto. The members 72, 74, 76 are the contents of the class represented by the class window 68. The members can be thought of as instance variables (data) of the class. In their own right, the members can be classes from a class library which are added to the class window 68 in any of a number of different ways. For example, visual representations of common classes can be provided in the tool bar 62 of the window 60, or can be provided in a class tree structure in another window of the graphical user interface for the application development tool and dragged and dropped within the class window 68 to establish its member relationship. Further, the member can at first be an empty shell which the developer adds to the class window, which the developer then writes the code for via an appropriate window or editor that the developer may open of access by, for example, double clicking on the visual representation of the member within the class window 68. Alternatively, the developer may import code to the member from another source to provide function and/or data to the member.

The member 72 of FIG. 4 represents a check box, which is a common graphical user interface element, and is labeled "checkbox1". The member 74 of the class window 68 represents a button, another common element of a GUI, and is labeled "button3". The member 76 represents an area in which the developer may add text for display in the GUI in which the class represented by the container class is displayed, and is labeled "textarea2".

Figure 5:
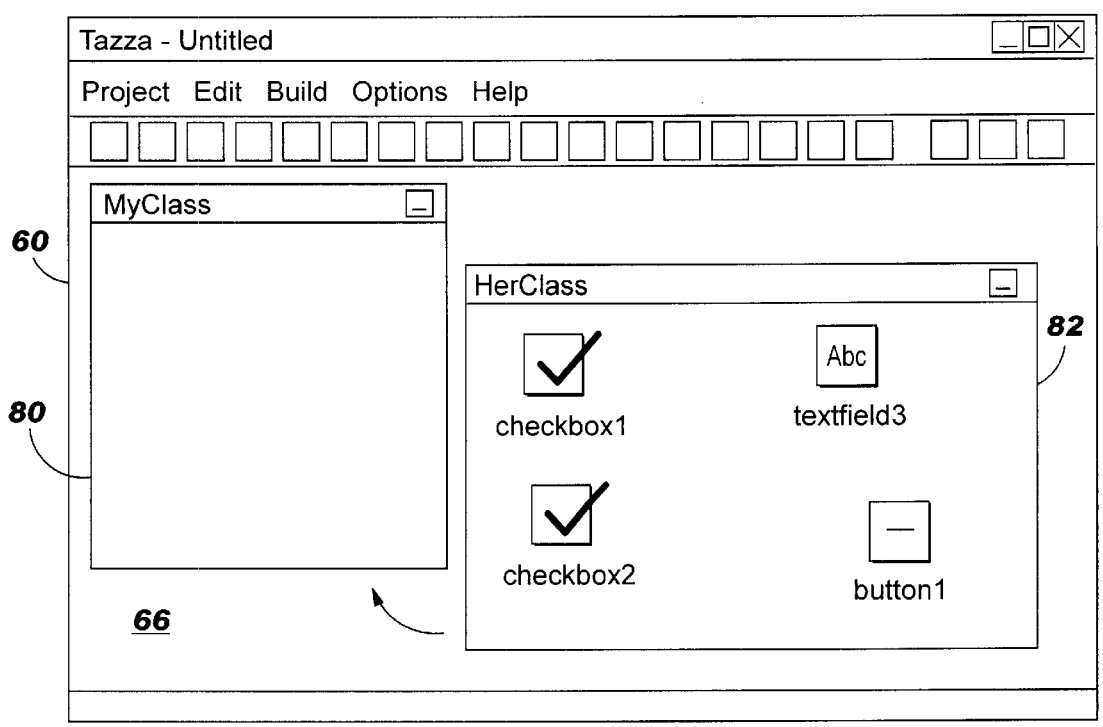
FIG. 5 illustrates a class development window in which two class container windows are present.

FIG. 5 illustrates a situation in which two different classes are graphically illustrated in the work space 66 of the window 60. A class window container 80 includes no members at this time, and is labeled "MyClass". A class window container 82 contains four members, and is named "HerClass". No relationship between the classes represented by the containers 80, 82 has been established in FIG. 5, but, as discussed above, by dragging one of the windows into the other, the dragged class can be established as a member of the class into whose container window it was dragged. An arrow is provided in FIG. 5 to illustrate the concept that the class window 82 can be dragged into the class window 80.

Figure 6:
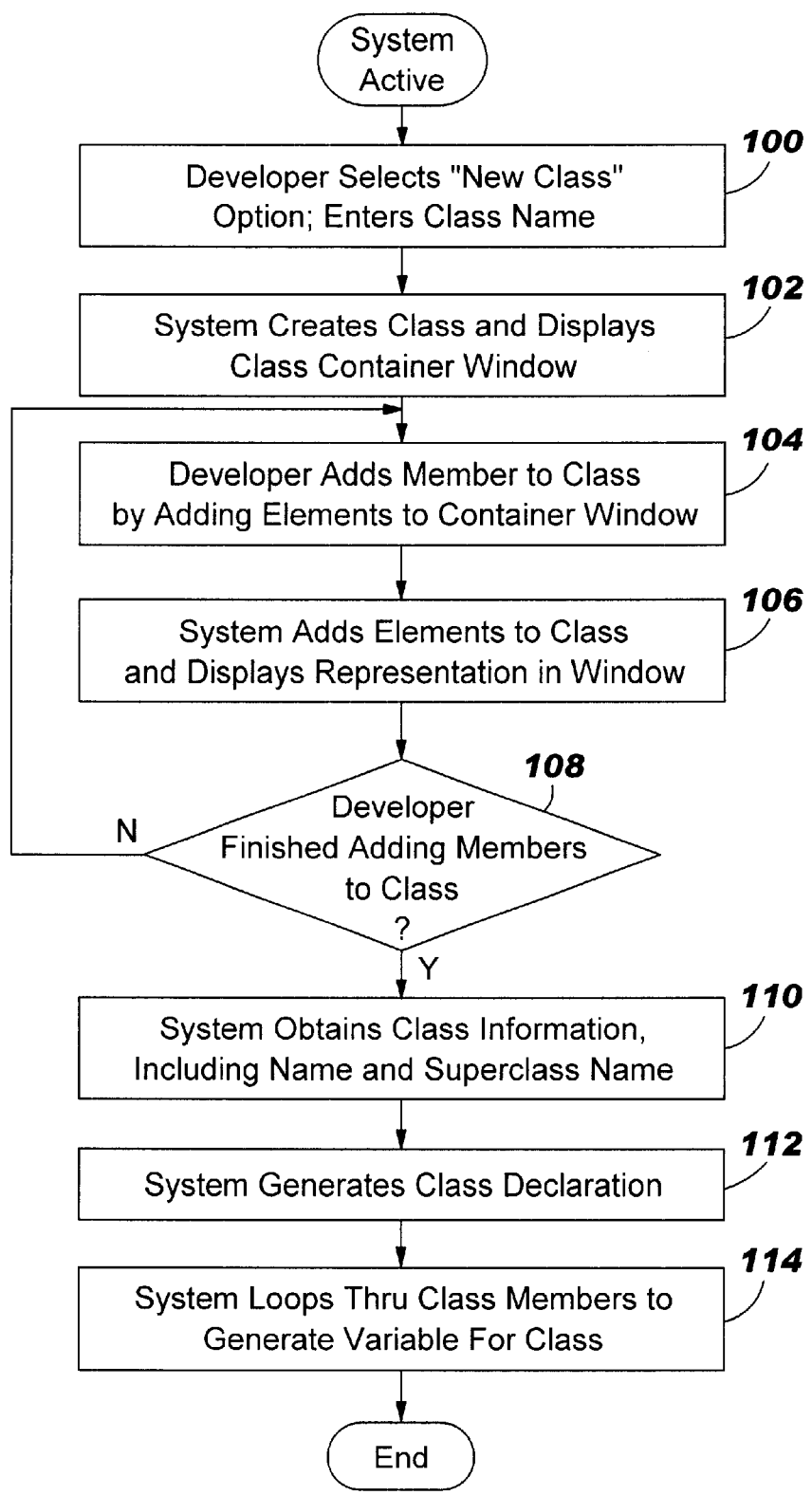
FIG. 6 is a flowchart which illustrates the logical steps involved with implementing the present invention.

FIG. 6 illustrates a flowchart which shows the logical steps involved with the use of the present invention. As per Step 100, the present invention is initiated when the developer selects a "new class" option from the tool bar 62 of the window 60 of FIG. 3. Processing then proceeds to Step 102, in which a class is created and rendered within the window 60 as the container window 68. The developer will then typically provide a name for the class, or the system will provide a default name. As per Step 104, the developer then populates the class (creates class members) by, for example, dragging and dropping components from the tool bar 62 or a palette (not shown) or a class tree structure (not shown) into the class container window 68. These resulting members of the class are rendered inside the class container window utilizing a representative icon or a other visual representation of some type that may include the name of the member (Step 106).

In accordance with standard object oriented programming processes, the developer will have at some time defined where in the application the newly created class belongs. Since the application is an object oriented application, this means that the developer has located the class within the class/object hierarchy which defines the application being created. Thus, when the developer indicates the she is finished adding members to the class and wants to have the system generate the code for the class (Step 108), processing proceeds to Step 110. In Step 110, the system obtains needed information about the class in order to generate the code for the class. This information includes the name of the class and the name of the superclass for the class, and is readily available based in the development steps performed above. With this information and in accordance with known techniques, the system then generates the class declaration (Step 1 12). Next, as per Step 114, the systems loops through the class members which were added to the class to generate variables for the class. Once again, the process of creating the variables is performed in accordance with known techniques. Processing then ends.

Although the present invention has been described with respect to a specific preferred embodiment thereof, various changes and modifications may be suggested to one skilled in the art and it is intended that the present invention encompass such changes and modifications as fall within the scope of the appended claims.

What is claimed is:

1. Computer readable code stored on media for permitting a software developer to visually building a class and displaying contents of the class in an intuitive manner, comprising:

first subprocesses for displaying a container window representing a class upon selection by a user of an option to create a new class;

second subprocesses for permitting the user to populate the class with members by adding visual representations of elements which represent code to the container window;

third subprocesses for displaying the visual representations of the elements which comprise the members of the class within the container window; and fourth subprocesses for generating code for the class represented by the container window.

2. Computer readable code according to claim 1, wherein the members are class objects.

3. Computer readable code according to claim 1, further comprising:

fifth subprocesses for permitting the user to add a first class as a member to a second class by dragging a container window representing the first class into a container window representing the second class.

4. Computer readable code according to claim 1, wherein the members become instance variables for the class being built.

5. Computer readable code according to claim 1, wherein the visual representations are dragged by the user to the container window from a tool bar which includes at least some of the available visual representations.

6. In a computing environment, a system for permitting a developer to visually build a class, comprising:

means for displaying a container window representing a new class upon selection by a user of a new class option;

means for permitting the user to add variables to the class by adding visual representations of the variables to the container window;

means for displaying the visual representations within the container window to indicate that the variables which correspond to the visual representations are associated with the class; and means for generating code for the class represented by the container.

7. A system according to claim 6, further comprising:

means for permitting the user to add a first class as a component of the new second class by dragging a container window representing the first class into the container window representing the new class.

8. A system according to claim 6, wherein the visual representations are dragged by the user to the container window from a tool bar which includes at least some of the available visual representations.

9. A method for permitting a software developer to visually building a class and displaying contents of the class in an intuitive manner, comprising:

upon selection by a user of an option to create a new class, displaying a container window representing the new class;

permitting the user to populate the new class with members by adding visual representations of elements which represent code to the container window;

displaying the visual representations of the elements which comprise the members of the new class within the container window; and generating code for the new class represented by the container window.

10. A system according to claim 9, further comprising:

means for permitting the user to add a first class as a component of the new second class by dragging a container window representing the first class into the container window representing the new class.

11. A method according to claim 9, wherein the members become instance variables for the new class being built.

12. A method according to claim 9, wherein the visual representations are dragged by the user to the container window from a tool bar which includes at least some of the available visual representations.

* * * * *